Feb. 12, 1952     J. L. OLSEN     2,585,491
CONTINUOUS ADSORPTION PROCESS
Filed April 14, 1949     2 SHEETS—SHEET 2

INVENTOR.
JOHN L. OLSEN
BY *Busser and Harding*
ATTORNEYS

Patented Feb. 12, 1952

2,585,491

UNITED STATES PATENT OFFICE 2,585,491

CONTINUOUS ADSORPTION PROCESS

John L. Olsen, Upland, Pa., assignor to Sun Oil Company, Philadelphia, Pa., a corporation of New Jersey Application April 14, 1949, Serial No. 87,489

12 Claims. (Cl. 260—674)

This invention relates to the separation of organic materials by selective adsorption. More particularly it relates to a continuous method for effecting separation of components from a liquid organic mixture, in which method a selective adsorbent in particulate form is continuously passed through a series of contact zones within each of which the adsorbent and liquid being treated is maintained in the form of a suspension.

It is well recognized that different types of organic compounds often have different adsorbabilities on various known adsorbents and that such compounds may be separated to an extent from each other by treatment of a charge mixture with a suitable adsorbent. For example, it is known that highly polar organic compounds may be removed from less polar or non-polar organic substances by selective adsorption on various adsorbents. Likewise it is known that hydrocarbons may be selectively separated according to chemical type by means of certain adsorbents, such as silica gel or activated carbon. Usually the hydrocarbons which are less saturated, i. e. which have more double bonds per molecule, are adsorbed preferentially to those which are more highly saturated. Thus the affinity of adsorbents for the several types of hydrocarbons usually increases in the following order: saturated hydrocarbons (i. e. paraffins and naphthenes); olefins; aromatics. The treatment of a mixture composed of two or more of such types of hydrocarbons with a suitable adsorbent accordingly will tend to effect separation according to chemical type. For instance, aromatics or olefins or both can be preferentially separated from saturated hydrocarbons, or aromatics can be selectively removed from olefins, by means of suitable known adsorbents.

The usual procedure for carrying out selective adsorption operations with a liquid charge mixture is merely to filter the charge through a stationary body of the adsorbent until its effectiveness for making a further separation of the components has decreased to an uneconomic level. Introduction of the charge is then discontinued and the adsorbate is removed from the contact mass. This may be accomplished by washing with a suitable solvent, heating, blowing with a gas such as steam or flue gas, or by a combination of such methods. The adsorbent is then re-used for further treatment of charge material in another cycle of operation.

The above described prior art procedure utilizing the adsorbent in the form of a stationary bed entails certain inherent disadvantages, especially in that the composition of product from the adsorption zone varies throughout the cycle therefore requiring proper selection and segregation of product cuts. Also, an intermediate portion of the filtrate product is apt to be of composition approaching that of the charge thus limiting the yields of desired product. Further, the decline in activity of adsorbent during use over a prolonged time necessitates shutting down the operation for replacement, as continuous replacement in amount sufficient to maintain the desired activity is not practicable where the adsorbent is maintained as a stationary body.

The present invention is directed to a continuous process for effecting separations by selective adsorption in which the adsorbent is continuously recycled through a system comprising a plurality of contact zones in series. The process may be so regulated as to effect substantially any desired degree of separation between the charge components, and the products obtained under any selected set of operating conditions will be of substantially constant composition at all times during the operation. The process also lends itself to continuous replacement of the adsorbent, if desired, so that the activity of the circulating adsorbent may be maintained at a constant level.

Briefly, the process according to the invention comprises continuously passing the adsorbent through a series of separate contact zones and feeding the organic liquid charge mixture continuously into one of the zones, preferably an intermediate zone, in the series. In each zone the adsorbent is maintained in suspension in the organic liquid being treated therein, and a continuous stream of the suspension is withdrawn from each contact zone and fed to an individual separation zone. In each of the latter zones non-adsorbed liquid is separated from the adsorbent and adsorbate. A portion of the non-adsorbed liquid is returned to the contact zone from which it was withdrawn, while the remainder is fed to the contact zone next upstream with respect to the direction of adsorbent flow. The adsorbent-adsorbate mixture is fed from the separation zone into the contact zone next downstream. Non-adsorbed liquid separated from the suspension obtained from the first contact zone in the series, or preferably a portion thereof, is withdrawn as one of the products of the process, such product comprising the less adsorbable charge component in enriched form. The adsorbent-adsorbate mixture separated from the suspension obtained from the last contact zone is transferred to a desorption zone, wherein the adsorbate is separated and the adsorbent is obtained in dry form. A portion of the resulting adsorbate is continuously fed back into the last contact zone in the series as reflux, while the remainder is withdrawn as the other product of the process. This product comprises the more adsorbable charge component in enriched form. Dry adsorbent obtained from the desorption zone is recycled back to the first contact zone for further use in the process.

Any adsorbent which will preferentially adsorb one type of component in the particular charge mixture to be separated may be used in conducting the process. Preferably an adsorbent which has a high adsorption capacity and a high degree of selectivity between the components of the charge mixture is employed. Among the commercially available adsorbents silica gel and activated carbon have adsorptive properties which are especially suitable for separating many types of organic mixtures to which the present process is applicable. Silica gel is especially effective for selectively adsorbing a more highly polar compound from a less highly polar compound or for separating hydrocarbons having different degrees of saturation. Activated carbon is also effective for separating hydrocarbons according to chemical type and in some instances will, to an extent, separate hydrocarbons of the same type according to molecular weight. In many cases activated carbon is capable of selectively adsorbing non-polar compounds, for example hydrocarbons, from polar compounds, for example alcohols, ethers, esters, ketones, aldehydes, etc. It is to be understood, however, that the process according to the invention may be practiced with other types of adsorbents and in fact with any other adsorbent which exhibits a substantial selectivity between the components of the particular charge mixture to be treated.

The description which follows is made with reference to the accompanying drawings in which.

Figure 1:
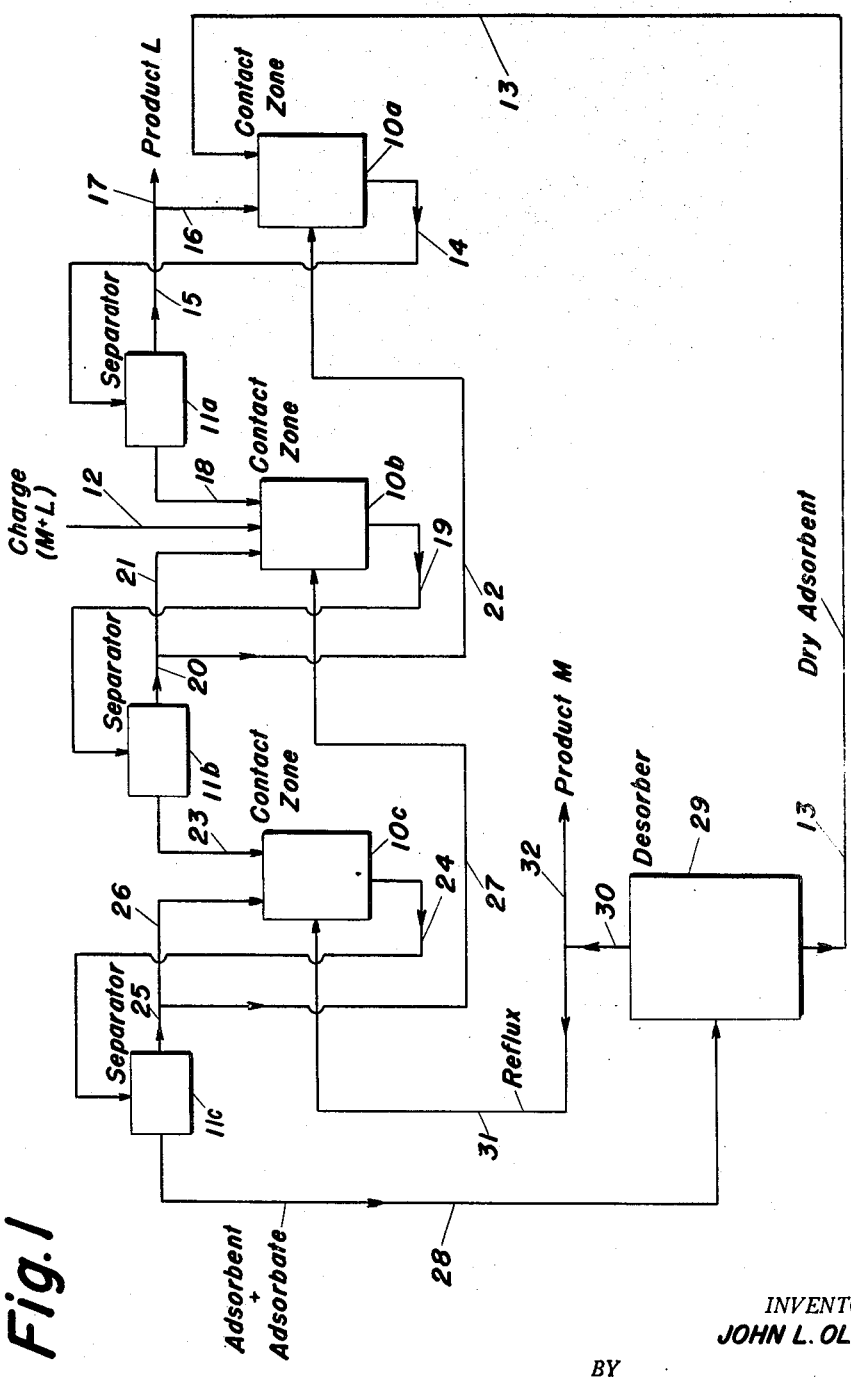
Fig. 1 is a simplified diagrammatic illustration of the process.

Referring to Fig. 1, the process is illustrated therein as including three contact zones arranged in series and designated 10-a, 10-b and 10-c, but it is to be understood that the process may be practiced with any number of contact zones that may be required to effect the separation desired. After each contact zone individual separators 11-a, 11-b, and 11-c are provided for removing non-adsorbed liquid from the mixture of adsorbent and adsorbate.

The charge mixture, which for purposes of illustration may be considered to be composed of components M and L, with M being the more strongly adsorbable component, is fed continuously in liquid form through line 12 into the intermediate contact zone 10-b. Dry adsorbent is continuously introduced in any suitable manner through line 13 into contact zone 10-a and is therein maintained in the form of a suspension of adsorbent in the liquid therein being treated. Agitating means (not shown) may be provided, if necessary, to insure that the adsorbent will remain suspended in the liquid. A stream of the suspension is continuously withdrawn from contact zone 10-a through line 14 and is sent to separator 11-a, wherein separation of the non-adsorbed liquid from adsorbent and adsorbate is effected. The non-adsorbed liquid is continuously withdrawn through line 15 and a portion of it is passed through line 16 back into contact zone 10-a. The remainder is removed from the system through line 17 as the product containing component L in enriched form.

The main purpose in returning a portion of the non-adsorbed liquid from the separator to the contact zone from which it was withdrawn is to insure that the ratio of liquid to adsorbent within the contact zone will be sufficiently high that the mixture will be a fluid suspension. Ordinarily a relatively high ratio of adsorbent to charge material will be required to achieve the degree of separation desired, in which case it will be necessary to return a portion—usually a major portion—of the liquid from the separation zone to the contact zone so that the mixture in the contact zone will be in the desired fluid state rather than in the form of a wet mass.

The adsorbent-adsorbate mixture obtained from separator 11-a is introduced through line 18 into the feed stage contact zone 10-b. An adsorbent-liquid suspension is likewise maintained in this zone and a stream of the same is continuously withdrawn through line 19 and sent to separator 11-b wherein separation of the non-adsorbed liquid from adsorbent and adsorbate is again effected. The non-adsorbed liquid passing from separator 11-b through line 20 is returned in part through line 21 back to contact zone 10-b while the remainder is passed through line 22 to contact zone 10-a.

The adsorbent-adsorbate mixture obtained from separator 11-b is introduced by means of line 23 into the next contact zone 10-c where again a fluid suspension is maintained. A stream of the suspension is likewise withdrawn from contact zone 10-c and introduced through line 24 into separator 11-c. Again a separation of non-adsorbed liquid from the adsorbent and adsorbate is effected; and the non-adsorbed liquid withdrawn through line 25 is sent in part through line 26 back to contact zone 10-c, the remainder being passed through line 27 to contact zone 10-b.

The adsorbent-adsorbate mixture obtained from the last separator 11-c is passed through line 28 to a desorption zone 29 adapted to remove the adsorbate from the adsorbent, leaving the latter in dry form. The separated adsorbate is removed through line 30 and a portion of it is passed through line 31 back to contact zone 10-c as reflux. The remainder is withdrawn from the system through line 32 as the product containing component M in enriched form. Dry adsorbent obtained from the desorber is returned through line 13 to contact zone 10-a for re-use in the process.

The above described process in principle is analogous in certain respects to a conventional plate to plate fractional distillation process, and such analogy may be drawn as an aid in understanding the fundamental principles and the factors upon which the effectiveness of separation depends. It is well recognized that in order to attain a desired degree of separation of a mixture in fractional distillation the number of theoretical plates employed and the reflux ratio used are important and interrelated. For any particular separation there is a minimum number of theoretical plates (corresponding to an infinite reflux ratio) and a minimum reflux ratio (corresponding to an infinite number of theoretical plates) that must be employed. These depend upon the relative volatility of the components being separated. As the number of theoretical plates is increased the necessary reflux ratio for obtaining the separation decreases. In practice the number of plates and the corresponding reflux ratio are selected to give the most economical operation.

In the present process the selectivity of the adsorbent or in other words the relative adsorbabilities of the components is comparable to relative volatilities in distillation. The adsorbent functions in a manner equivalent to the heat supplied in distillation. The liquid phase of the suspension in each contactor and the adsorbed phase on the adsorbent are analogous, respectively, to the liquid and vapor within a distillation column; and transfer of material between the liquid phase and the adsorbed phase is equivalent to the transfer between liquid and vapor in distillation. The portion of adsorbate product which is returned to the last contact zone in the series is similar to reflux returned to the top of a distillation column; while the non-adsorbed liquid that is sent to the contact zone next upstream from the zone from which it is obtained is similar to the liquid that flows from plate to plate in a distillation tower. That portion of non-adsorbed liquid which is returned to the same zone from which it was obtained does not, however, have any analogy in the ordinary distillation procedure. There are a minimum number of theoretical adsorption stages and a minimum reflux ratio, dependent upon the relative adsorbabilities of the components being separated, below which values the particular degree of separation desired cannot be accomplished. Accordingly, the required number of adsorption stages and reflux ratio for operating the present process to achieve any given degree of separation may be determined from relative adsorbability data by means of engineering calculations similar to those used for distillation operations. In such manner the rates of addition and withdrawal of streams in the process and the required number of contact zones may be ascertained. The rate of movement of adsorbent determines, together with its adsorptive capacity, the rate at which adsorbate moves through the system, just as the boil-up rate in distillation determines the rate of flow of vapors.

Figure 2:
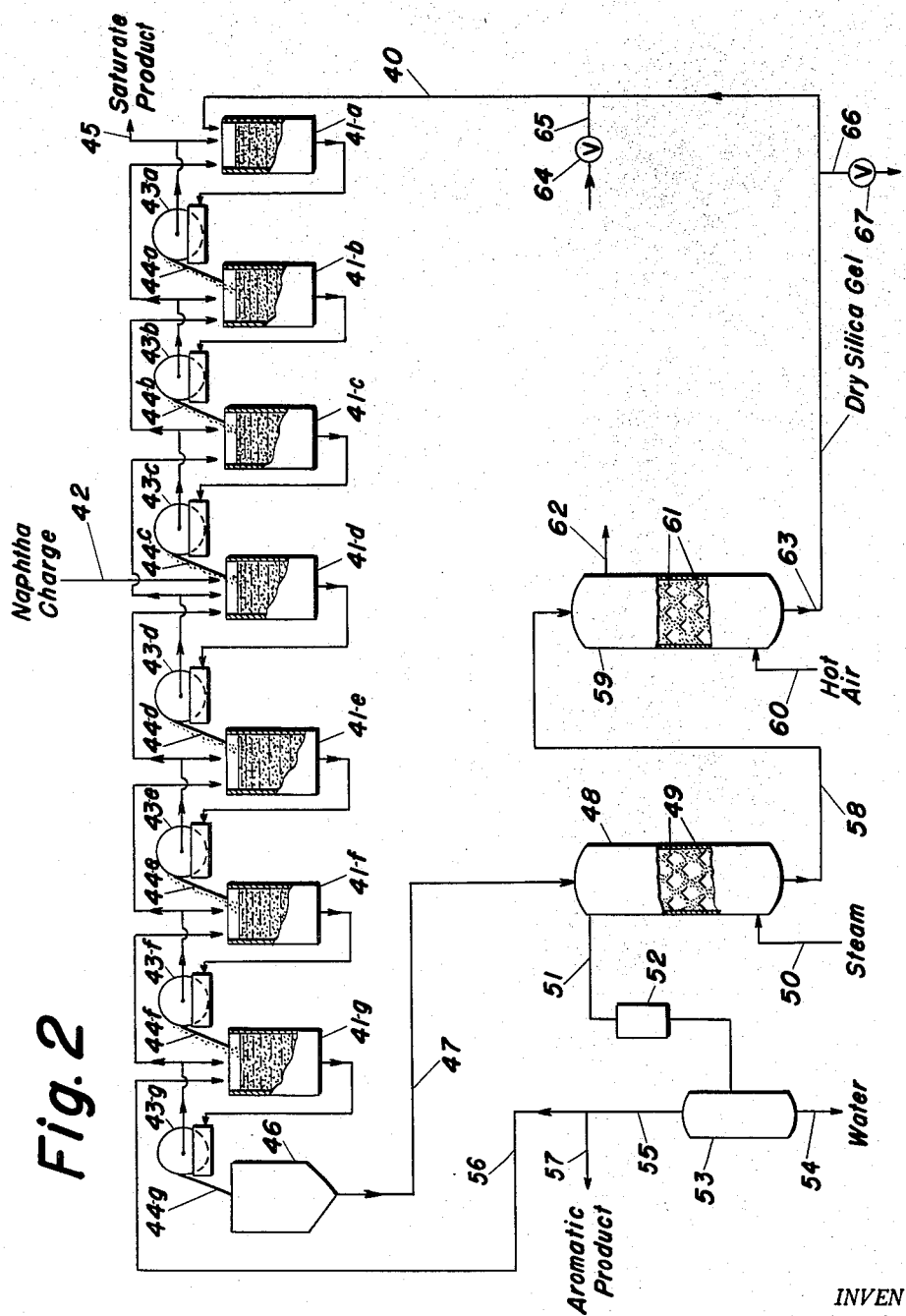
Fig. 2 is a diagrammatic view partly in section illustrating one embodiment of the process in more detail.

Fig. 2 shows a more specific embodiment of the invention, in which the process is conducted with seven contact zones, three being above the feed stage and three below. By way of illustration the process will be described for separating a gasoline or naphtha fraction, for example, a naphtha boiling in the range of 300–400° F., into an aromatic product and a saturate hydrocarbon product. For such separation silica gel or activated carbon would be a particularly suitable adsorbent. In the present description the process will be considered as utilizing silica gel as the adsorbent.

In the process of Fig. 2 finely divided silica gel is fed in dry form continuously through line 40 into the first of a series of contact zones, designated as 41–a, 41–b, 41–c, 41–d, 41–e, 41–f and 41–g, and the naphtha charge is continuously introduced as a liquid through line 42 into the middle contact zone 41–d. In each zone a fluid suspension of silica gel in the hydrocarbons therein being treated is maintained in any suitable manner. For this purpose agitating means, such as a stirrer, may be provided in each zone if desired, in order to keep the silica gel suspended in the hydrocarbons. However, when the silica gel is sufficiently finely divided and there is sufficient turbulence resulting from introduction of the various streams, no additional means for agitating will be required. From the bottom of each contact zone a stream of the suspension is continuously withdrawn and sent to a separation zone, illustrated in Fig. 2 as rotary filters 43–a, 43–b, 43–c, 43–d, 43–e, 43–f and 43–g. The filters are provided with scrapers 44–a, 44–b, 44–c, 44–d, 44–e, 44–f and 44–g, adapted to continuously remove the silica gel-adsorbate mixture from the filter and direct the same into the next downstream contact zone. The non-adsorbed liquid filtrate issuing from each of the filters is sent in part to the contact zone from which it was obtained while the remainder is passed to the next upstream contact zone, in the manner described in connection with Fig. 1. The amount of filtrate which is returned to the same contact zone from which it was derived need be only enough to insure that the silica-gel hydrocarbon mixture in the zone remains in the form of a liquid suspension.

Upon contact of the naphtha charge with the silica gel in zone 41–d, aromatics will tend to be selectively adsorbed and carried with the adsorbent to the next downstream contact zone 41–e, while the saturate hydrocarbons will tend to concentrate in the filtrate and therefore move in an upstream direction. Likewise selective separation of aromatics from non-aromatics will occur in contact zone 41–e, so that aromatics will be preferentially carried by the adsorbent to contact zone 41–f while any saturate hydrocarbons will tend to move back to contact zone 41–d. Such tendencies as to the direction of flow of the charge components will prevail throughout the series of contact zones, resulting in the concentration of saturates at one end and aromatics at the other end of the series. Saturates in enriched form are withdrawn from the upstream end through line 45 as one product of the process, while aromatics in enriched state pass from the last downstream filter 43–g into hopper 46 as the adsorbate on the silica gel.

The silica gel containing adsorbed aromatics is removed from the bottom of hopper 46 and passed in any suitable manner, such as by means of a screw conveyor (not shown), through line 47 into suitable apparatus for removing the hydrocarbons from the silica gel. Before entering such apparatus the silica gel may, if desired, be preheated in any suitable manner to facilitate removal of the hydrocarbons. One form of apparatus as illustrated in Fig. 2 comprises a stripper or desorber 48 through which the silica gel is permitted to fall over a series of baffles 49 countercurrent to a stripping gas, for instance, steam which is admitted near the bottom of the stripper through line 50. Upon contacting the wet silica gel the steam causes the hydrocarbons to vaporize and pass out of the stripper through line 51 and into a condenser 52 and thence to a gravity separator 53. Water is withdrawn from the bottom of the separator through line 54 while the hydrocarbons are removed from the top through line 55. A portion of the hydrocarbons is returned by means of line 56 to contact zone 41–g as reflux for the process. The remainder is withdrawn from the system through line 57 as the aromatic product.

The stripped silica gel leaving the bottom of stripper 48 contains adsorbed water which should be removed before the silica gel is returned to contact zone 41-a for re-use. Accordingly, a drier 59 is provided for blowing the silica gel with hot air or other inert gas, which is admitted through line 60 near the bottom of the drier, in order to drive out the adsorbed water. The silica gel is transferred from the bottom of stripper 48 through line 58 in any suitable manner, such as by means of a screw conveyor (not shown), to the top of drier 59. The drier also may be provided with baffles 61 over which the silica gel falls as it travels downwardly countercurrent to the hot air. The mixture of hot air and removed water is vented from the drier by means of line 62. The dry silica gel removed from the bottom through line 63 may be sent through line 40 directly back to the first contact zone 41-a or, if desired, may first be passed through a cooler (not shown) and then returned to contact zone 41-a.

In case of loss of adsorbent from the system, additional silica gel may be introduced therein, as by means of valve 64 and line 65. Means may also be included for withdrawing silica gel from the system, if desired, either intermittently or continuously so that the average activity of the circulating adsorbent may be maintained at the desired level by the addition of fresh silica gel through line 65. Such means are illustrated in Fig. 2 in the form of line 66 containing valve 67. It is to be understood, however, that any suitable or convenient means may be employed for adding the adsorbent to, or removing it from, the system.

While in the process illustrated in Fig. 2 treatment of the adsorbent in the desorption zone is carried out by means of steam followed by hot air, it is to be understood that any other manner of treatment suitable for removing the adsorbate and drying the silica gel may be used. For example, if the adsorbed material is sufficiently low boiling, it may be distilled off merely by heating the silica gel or by blowing it with an inert gas which, unlike steam, is not adsorbed by the silica gel. If the adsorbate is high boiling, as would be the case where a lubricating oil fraction is being charged to the process for separation into aromatic and saturate products, it may be desirable first to displace the adsorbate from the silica gel by means of a suitable liquid desorbing agent, such as a low boiling alcohol, ketone, ether or other polar solvent, and then to remove the desorbing agent by means of heat, steam, inert gas or a combination of such means. When activated carbon is used as the adsorbent, steaming alone is sufficient for effecting regeneration, inasmuch as activated carbon has little if any tendency to adsorb water.

In practicing the invention substantially any desired product purity may be obtained as to either the saturate or aromatic product or both by employing a sufficient number of contact zones and by operating under the necessary reflux conditions. The number of contact zones and the amount of reflux that should be used for any given degree of separation may readily be determined by engineering calculations analogous to those employed for conventional distillation processes.

In some cases it may be desired to practice the process without any contact stages upstream from the feed stage, such as, for example, where it is desired to obtain the more adsorbable component in relatively pure form but where the percentage recovery of such component from the charge is not of particular importance. In such instance, one or more contact zones may be provided downstream from the feed stage, the number being sufficient to effect the desired degree of purification, without any contact zones upstream from the feed stage. As a general rule, however, it will be preferred to conduct the process utilizing a multiplicity of contact zones with the charge material being introduced to an intermediate zone in the series.

It will be seen that the principles of the present invention are applicable to the separation of a great variety of organic mixtures, including not only hydrocarbons but also non-hydrocarbons. For instance, various types of polar compounds such as alcohols, ethers, esters, aldehydes, ketones, amines, nitriles, nitro-compounds or the like may be separated from each other according to the present process. In fact the process is capable of resolving any liquid organic mixture into its component parts where the components have substantially different adsorbabilities on the particular adsorbent selected for use. It is to be understood that the invention is not limited to the treatment of binary mixtures but also embraces multicomponent mixtures containing one or more compounds having adsorbabilities intermediate those of the most adsorbable and least adsorbable components. In such case the intermediate compound or compounds will tend to concentrate in one or the other of the products of the process depending upon whether the adsorptive properties more nearly approach those of the most adsorbable component or of the least adsorbable component. Products so obtained may be retreated according to the invention to effect further separation.

Having described my invention, what I claim and desire to protect by Letters Patent is:

1. Continuous process for separating a liquid charge mixture of organic materials of different adsorbabilities by means of a selective adsorbent which comprises passing a particulate adsorbent, in the manner hereinafter specified, through a plurality of contact zones in series, introducing a liquid stream of the charge into one of said contact zones other than the last in said series, maintaining in each contact zone a suspension of adsorbent in the organic liquid being treated therein, withdrawing from each contact zone a stream of such suspension and feeding it to an individual separation zone, therein separating non-adsorbent liquid from adsorbent and adsorbate, continuously introducing the separated adsorbent and adsorbate from each individual separation zone other than the last into the contact zone next downstream with respect to the direction of adsorbent flow through the system, continuously returning a portion of such non-adsorbed liquid from each individual separation zone to the contact zone from which it was withdrawn, continuously passing the remainder of such non-adsorbed liquid from each separation zone other than the first to the next upstream contact zone, withdrawing as a product of the process such remainder of non-adsorbed liquid obtained from the first separation zone, passing the adsorbent and adsorbate obtained from the last separation zone to a desorption zone and therein removing adsorbate from the adsorbent, continuously returning a portion of the removed adsorbate having essentially the same composition as the total adsorbate to the last contact zone as reflux, withdrawing the remainder of the removed adsorbate as the other product of the process, and returning dry adsorbent to the first contact zone for re-use in the process.

2. Continuous process for separating a liquid charge mixture of organic materials of different adsorbabilities by means of a selective adsorbent which comprises passing a particulate adsorbent, in the manner hereinafter specified, through a plurality of contact zones in series, introducing a liquid stream of the charge into an intermediate contact zone in said series, maintaining in each contact zone a suspension of adsorbent in the organic liquid being treated therein, withdrawing from each contact zone a stream of such suspension and feeding it to an individual separation zone, therein separating non-adsorbed liquid from adsorbent and adsorbate, continuously introducing the separated adsorbent and adsorbate from each individual separation zone other than the last into the contact zone next downstream with respect to the direction of adsorbent flow through the system, continuously returning a portion of such non-adsorbed liquid from each individual separation zone to the contact zone from which it was withdrawn, continuously passing the remainder of such non-adsorbed liquid from each separation zone other than the first to the next upstream contact zone, withdrawing as a product of the process such remainder of non-adsorbed liquid obtained from the first separation zone, passing the adsorbent and adsorbate obtained from the last separation zone to a desorption zone and therein removing adsorbate from the adsorbent, continuously returning a portion of the removed adsorbate having essentially the same composition as the adsorbate to the last contact zone as reflux, withdrawing the remainder of the removed adsorbate as the other product of the process, and returning dry adsorbent to the first contact zone for re-use in the process.

3. Process according to claim 2 wherein the charge mixture is composed of hydrocarbons having different degrees of saturation and the adsorbent is silica gel.

4. Process according to claim 2 wherein the charge mixture is composed of hydrocarbons having different degrees of saturation and the adsorbent is activated carbon.

5. Continuous process for separating a liquid hydrocarbon charge composed of aromatic and saturate hydrocarbons into an aromatic product and a saturate product by means of a selective adsorbent which comprises passing finely divided adsorbent, in the manner hereinafter specified, through a plurality of contact zones in series, introducing a liquid stream of said hydrocarbon charge into an intermediate contact zone in said series, maintaining in each contact zone a suspension of adsorbent in the hydrocarbon liquid being treated therein, withdrawing from each contact zone a stream of such suspension and feeding it to an individual separation zone, therein separating non-adsorbed hydrocarbon liquid from adsorbent and adsorbate, continuously introducing the separated adsorbent and adsorbate from each individual separation zone other than the last into the contact zone next downstream with respect to the direction of adsorbent flow through the system, continuously returning a portion of such non-adsorbed liquid from each individual separation zone to the contact zone from which it was withdrawn, continuously passing the remainder of such non-adsorbed hydrocarbon liquid from each separation zone other than the first to the next upstream contact zone, withdrawing non-adsorbed hydrocarbon liquid obtained from the first separation zone as the saturate product, passing the adsorbent and adsorbate obtained from the last separation zone to a desorption zone and therein removing adsorbate from the adsorbent, continuously returning a portion of the removed adsorbate having essentially the same composition as the total adsorbate to the last contact zone as reflux, withdrawing the remainder of the removed adsorbate as the aromatic product, and returning dry adsorbent to the first contact zone for re-use in the process.

6. Process according to claim 5 wherein the adsorbent is silica gel.

7. Process according to claim 6 wherein the hydrocarbon charge is a naphtha fraction.

8. Process according to claim 5 wherein the adsorbent is activated carbon.

9. Process according to claim 8 wherein the hydrocarbon charge is a naphtha fraction.

10. Continuous process for separating a liquid hydrocarbon charge composed of olefinic and saturate hydrocarbons into an olefinic product and a saturate product by means of a selective adsorbent which comprises passing finely divided adsorbent, in the manner hereinafter specified, through a plurality of contact zones in series, introducing a liquid stream of said hydrocarbon charge into an intermediate contact zone in said series, maintaining in each contact zone a suspension of adsorbent in the hydrocarbon liquid being treated therein, withdrawing from each contact zone a stream of such suspension and feeding it to an individual separation zone, therein separating non-adsorbed hydrocarbon liquid from adsorbent and adsorbate, continuously introducing the separated adsorbent and adsorbate from each individual separation zone other than the last into the contact zone next downstream with respect to the direction of adsorbent flow through the system, continuously returning a portion of such non-adsorbed liquid from each individual separation zone to the contact zone from which it was withdrawn, continuously passing the remainder of such non-adsorbed hydrocarbon liquid from each separation zone other than the first to the next upstream contact zone, withdrawing non-adsorbed hydrocarbon liquid obtained from the first separation zone as the saturate product, passing the adsorbent and adsorbate obtained from the last separation zone to a desorption zone and therein removing adsorbate from the adsorbent, continuously returning a portion of the removed adsorbate having essentially the same composition as the total adsorbate to the last contact zone as reflux, withdrawing the remainder of the removed adsorbate as the olefinic product, and returning dry adsorbent to the first contact zone for re-use in the process.

11. Process according to claim 10 wherein the adsorbent is silica gel.

12. Process according to claim 10 wherein the adsorbent is activated carbon.

JOHN L. OLSEN.

REFERENCES CITED

The following references are of record in the file of this patent:

UNITED STATES PATENTS

| Number | Name | Date |
|---|---|---|
| 1,678,298 | Patrick et al. | July 24, 1928 |
| 2,077,287 | Tuttle | Apr. 13, 1937 |
| 2,168,875 | Noll | Aug. 8, 1939 |
| 2,470,339 | Claussen et al. | May 17, 1949 |